United States Patent [19]

Dowell, Jr.

[11] 3,835,388

[45] Sept. 10, 1974

[54] FREQUENCY ADJUSTABLE ENCODER AND DECODER

[75] Inventor: William B. Dowell, Jr., Raleigh, N.C.

[73] Assignee: Aerotron, Inc., Raleigh, N.C.

[22] Filed: June 21, 1973

[21] Appl. No.: 372,348

[52] U.S. Cl. .............................. 325/64, 333/70 CR

[51] Int. Cl. .............................................. H04b 1/00

[58] Field of Search ....... 325/30, 64, 348, 476, 478, 325/60, 488, 490; 178/66, 67; 331/108 B, 135, 136, 179; 332/30 R, 30 V; 329/104; 333/70 CR

[56] References Cited

UNITED STATES PATENTS 3,070,762 12/1962 Evans ............................ 333/70 CR

*Primary Examiner*—Albert J. Mayer

*Attorney, Agent, or Firm*—Nicholas L. Coch, Esq.

[57] ABSTRACT

A completely frequency adjustable decoder and encoder circuit in a continuous tone coded squelch system of mobile radio is made possible through the use of a new null network. This filter network is characterized by the placement of field effect transistors or other isolation devices between phase shifting portions of the network. All the requirements of frequency stability, small standard components, immunity to mechanical shock, and low cost are simultaneously possible in this decoder-encoder circuit. Large inventory reduction is possible because only one set of frequency determining components are necessary instead of a multitude, and the decoder-encoder is characterized by single unit construction. Change of one frequency to another is easily accomplished in the field by simply adjusting a single control component in the null network. This is accomplished without having to order new parts for the filter, and the replacement which is often involved. The frequency change is made without affecting other tone squelch parameters (i.e., modulation, sensitivity, etc.) and only the newly selected frequency must be checked for accuracy.

16 Claims, 2 Drawing Figures

PATENTED SEP 10 1974

3,835,388

FREQUENCY ADJUSTABLE ENCODER AND DECODER

FIELD OF INVENTION

This invention relates to a frequency adjustable decoder-encoder useful in continuous tone coded squelch systems of mobile radio and to a filter network which prevents the passage of an input signal at a single selected frequency.

DESCRIPTION OF PRIOR ART

The electromechanical reed was used almost exclusively in continuous tone coded squelch systems prior to the 1960's. Many such systems were unstable, bulky, and operated intermittently when subjected to actual use in a mobile radio, for example. Thereafter, the parallel-tee network has been used in such systems. This network has substantially eliminated the problems arising from instability and road vibration encountered in mobile radio applications. However, this network satisfies the needs of the squelch system only at the frequency where infinite attenuation exists, and becomes useless at other desired frequencies because of appreciable signal transmission. The theoretical solution to this problem is the use of three ganged potentiometers, but this is hardly practical. At least 26 frequencies are used in a sub-audible squelch system, for example, and since a parallel-tee network must have three components varied to operate at a different frequency, a large number of components must be stocked by the manufacturer as well as dealers and service agencies for use in all frequency applications within a squelch system. Changes in tone squelch frequency in the field are therefore difficult to accomplish and commonly necessitate replacements of the entire tone squelch frequency unit with another factory-tuned unit.

It is a primary object of this invention to provide a decoder-encoder circuit for use in squelch systems and other systems which exhibits a high stability at low frequencies and which is miniature in size.

It is another object of this invention to provide a null network, for use in a squelch system and in other systems, which is stable, compact and readily adjustable to frequency change.

It is another object of this invention to provide a null network which is characterized by adjustment of a single continuously variable component to alter the null frequency of the network.

It is still another object of this invention to provide a null network which includes phase shifting capacitors all having the same value and all being standard precision miniature capacitors thereby reducing inventory costs and unit size.

These and other objects are accomplished by the decoder-encoder circuit and the null network of the invention which are hereinafter more fully described in the specification taken in conjunction with the drawing in which FIG. 1 is an electrical schematic drawing of the null network of the invention; and FIG. 2 is an electrical schematic drawing of the null network of FIG. 1 included in a decoder-encoder circuit useful in a continuous tone coded squelch system of a mobile radio.

DESCRIPTION OF THE INVENTION

The objects of the invention are realized by a filter or null network which includes impedance isolation means placed between phase shifting portions of the circuit and at the output of the filter. These isolation means function to effectively decouple the active phase shifting portions of the circuit, thereby eliminating the interaction of these circuit portions and the influence of the circuitry external to the filter. As a result, the transmission signal level and frequency selection are not adversely affected and may be readily controlled.

Generally, the filter comprises a phase shifting means adapted to receive the input voltage signal to the filter and separate it into two signals, phase shifted by 90° over the range of various frequencies of the input signal. In the preferred embodiment, this is accomplished by a first and a second phase shifting circuit arranged in parallel with each other, each circuit having a resistor and a capacitor connected in series. The output voltage of each of these circuits is taken at the junction node of each resistor and capacitor. Each output signal is then passed to an isolation device which presents a high impedance and effectively decouples the phase shifting circuits from the rest of the network. The isolation devices are a first and a second field effect transistor, connected respectively to the node junctions of the first and second phase shifting circuits. Isolation devices such as first and second vacuum tubes connected in an identical fashion, or other integrated circuit electronic devices exhibiting high input and low output impedance may also be used. The output signal of one isolation device is passed to a capacitor which serves to phase shift that signal and the output signal of the other isolation device is passed to a variable resistor. The phase shifting capacitor and variable resistor at the output of the isolation devices are connected in series and are adapted to cooperate to provide a zero voltage at the node junction between them at a preselected frequency component of the voltage signal. All other signal frequencies are passed from this node junction to the output terminal of the filter through a third isolation device which acts to decouple the capacitor and variable resistor from the external circuitry connected to the output terminal of the filter.

The variable resistor is the only continuously variable component needed in the circuit to provide for selection of the frequency to be blocked by the filter. By varying the value of this resistor to a certain value, preselection of a particular frequency is easily accomplished.

The use of high input impedance isolation devices such as field effect transistors also provides the additional advantage of permitting the capacitors of the phase shifting portions of the filter to be all of the same value. Furthermore, these capacitors may all be standard, commercially available capacitors of a miniature size thereby reducing unit size. Because the capacitors may all be of the same value independently of the frequency to be blocked by the filter, manufacturing costs and inventory requirements are greatly reduced. As a result, a null network having an adjustable center frequency and a high degree of stability may be economically manufactured in a miniature size on a single printed circuit board for use in many systems.

A decoder-encoder circuit for use in a continuous tone coded squelch system of a mobile radio includes the null network above described. This decoder-encoder circuit has a frequency of oscillation which is the center or null frequency of the null network. The center frequency is the only frequency blocked by the null network and the other frequencies are fed back to one input terminal of an amplifier. They are there subtracted from identical frequencies which are fed to the other input terminal of the amplifier from the input terminal of the decoder-encoder circuit. The only frequency which is allowed to pass through the amplifier is the one blocked by the filter and therefore not subtracted at the amplifier, i.e., the frequency of oscillation of the system.

The decoder-encoder circuit, including the filter network, is a compact unit of subminiature design. It employs integrated circuitry and has been packaged in a unit 0.2 cubic inches in size thus providing a commercially important device for mobile radios. The ability to change the frequency of oscillation of the system by varying a single control on the filter further enhances its value.

DETAILED DESCRIPTION OF THE DRAWING

Figure 1:
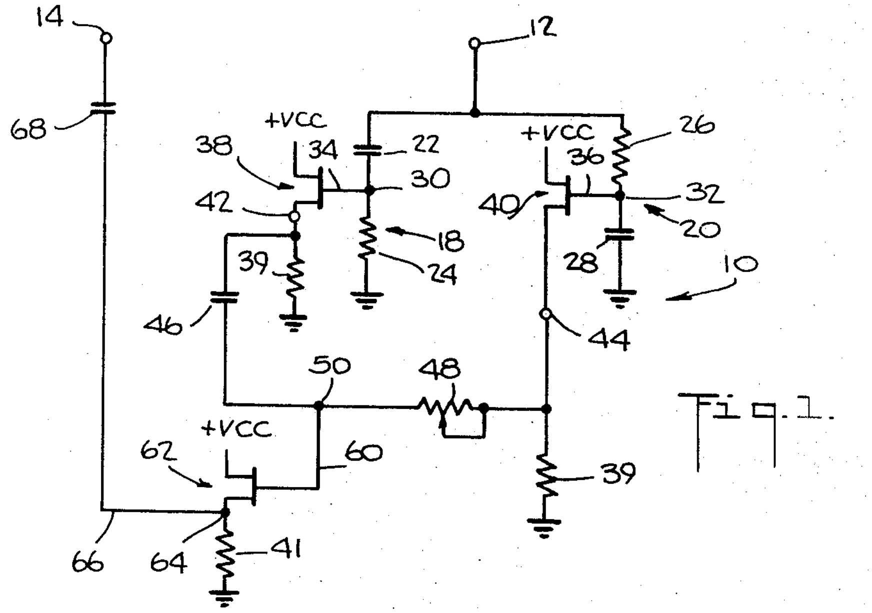

Referring now to the drawing, FIG. 1 illustrates the null network of the invention which is generally designated by the numeral 10. The filter 10 is shown as including an input terminal 12 and an output terminal 14. The input terminal 12 receives a voltage signal from some external circuitry such as that illustrated in FIG. 2, and passes it through conductors 16 to two phase shift circuits generally designated 18 and 20. Phase shift circuit 18 includes capacitor 22 connected in series with resistor 24 while phase shift circuit 20 includes resistor 26 connected in series with capacitor 28. Each of the phase shift circuits 18, 20 has a node junction designated by the numerals 30, 32 between resistors and capacitors. The output of the phase shift circuits is taken at these nodes 30, 32 and passed over conductors 34, 36 to the gates of field effect transistors (FET) 38, 40 respectively. At any particular frequency of the voltage appearing at input terminal 12, the output signals at nodes 30 and 32 are phase shifted with respect to each other by 90° due to the operation of the phase shift circuits 18 and 20.

The FETS 38 and 40 act as high impedance circuit elements serving to electrically isolate the circuits 18 and 20 from the rest of the null network 10, thus enabling the circuits 18 and 20 to operate independently of the remainder of the network. Because of this, the transmission level of the input signal is unaffected by the remainder of the circuitry and no adjustments in component values for transmission level variations need be taken into account. Resistors 39 which are connected between the source terminals 42, 44 of FETS 38, 40 and grounds are used for current drain purposes.

The output signals from the FETS appear at the source terminals 42, 44 and the source to source voltage is applied across capacitor 46 and resistor 48 which are connected in series. Because the signals have a relative phase difference of 90° between them as they are applied across the components 46, 48, the output voltage taken at the node junction 50 between these components and ground will experience a null or zero output at one particular frequency. Further explanation of the means by which a null exists at one particular frequency may be accomplished by expressing the source to source output signal of the FETS in diagrammatic form as the hypotenuse of a first right triangle. The output of phase shifters 18, 20 are in effect the opposite sides of the first right triangle with the first vortex at ground. The hypotenuse also represents the voltage across the combination of resistor 48 and capacitor 46 and the node 50 voltage will be the second vortex of the inscribed second right triangle where resistor 48 and capacitor 46 voltages are sides. With the same hypotenuse for the first and second triangles and with the first vortex at ground, it is a fact that both first and second vortex must lie on the same semicircle (equal ratio for first and second vortex). Conveniently, the second vortex will move in a semicircular path on the represented diagram as the value of resistance 48 is varied. At a certain value of resistor 48 for a specific frequency of the input signal voltage, the second vortex will coincide with that of the first vortex, and since the first vortex is ground, the second vortex must also be ground. Thus, zero voltage output will be delivered from the circuit at one particular frequency.

It will be appreciated that by a proper selection of component values, any specific frequency can be blocked from passing through the filter. The same filter 10 may be used for a number of frequencies by simply varying resistor 48. Thus, the null network 10 may be set to block a specific frequency or another depending solely upon the value of one component, resistor 48.

The output signal frequencies at junction 50 which are not blocked are passed through conductor 60 to FET 62. The output of this FET at source 64 is passed through conductor 66 to output terminal 14 through capacitor 68. Resistor 41 acts to draw current from FET to ground. Capacitor 68 is used as a coupling capacitor. FET 62 serves as a high impedance decoupling device to isolate capacitor 46 and resistor 48 from the external circuitry which may be connected to terminal 14, thereby permitting these components to function independently of external circuit influences.

Because of the decoupling effect of FETS 38, 40 and 62, capacitors 22, 28 and 46 may all have the same value and may be standard, commercially available, precision ceramic capacitors of a small size. This enables a substantial size reduction of the filter to be realized thus further enhancing its value to the manufacturer and user.

Figure 2:
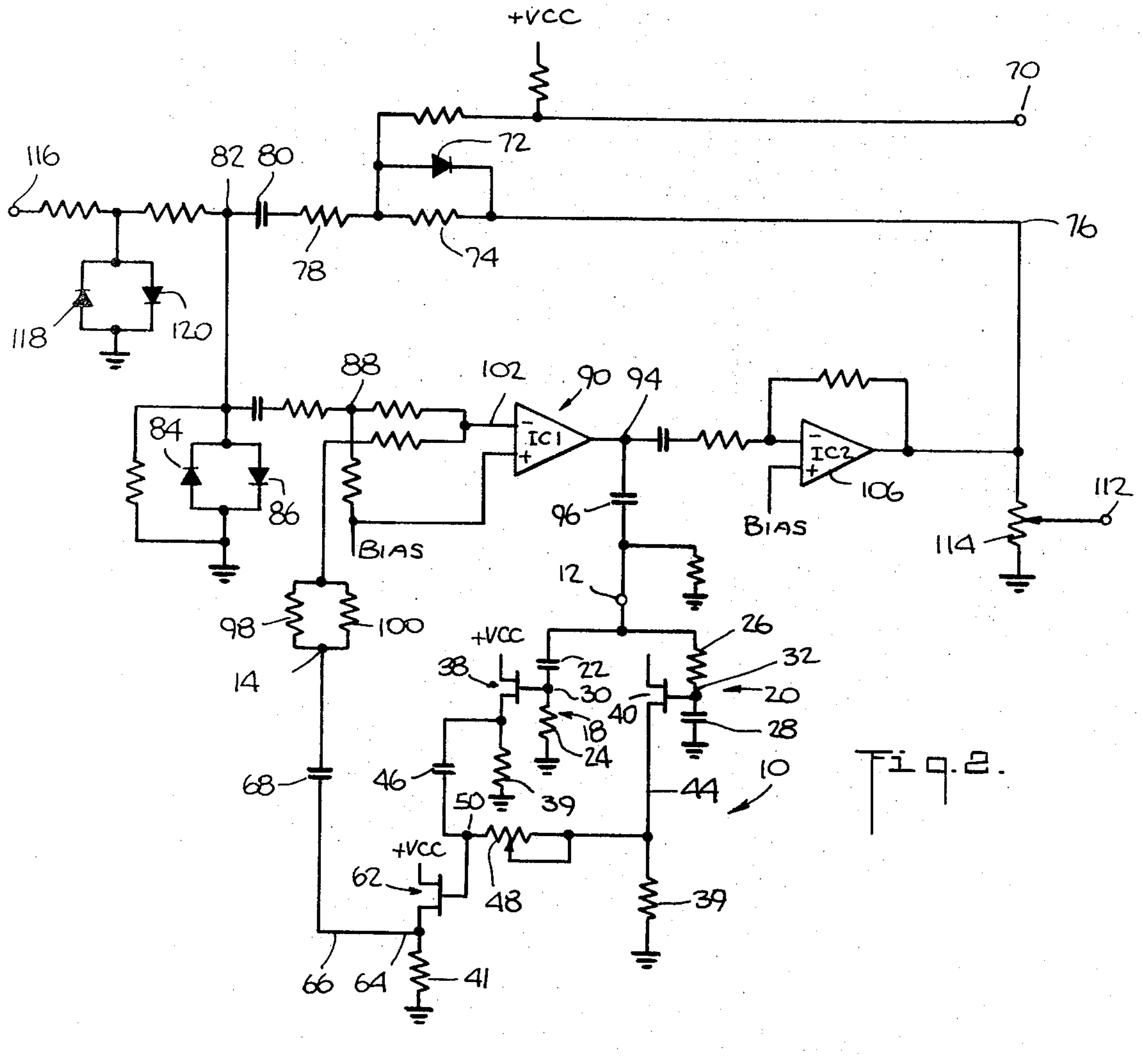

FIG. 2 illustrates the filter in operation in an encoder-decoder circuit of a continuous tone coded squelch system of a mobile radio. Referring now to FIG. 2, the unit will encode (oscillate) when terminal 70 is removed from ground. When this occurs, diode 72 becomes forward biased and resistor 74 is effectively short circuited. This causes more feedback of the voltage signal at junction 76 to be passed through diode 72, resistor 78 and capacitor 80 to junction node 82. The signal voltage fed back in this manner is of sufficient amplitude at one frequency to sustain itself in an oscillator loop with junction 76 as the output and junction 82 as the input terminals to the loop. The frequency of oscillation will be the center or null frequency of the filter circuit 10.

The input signal at junction 82 of the oscillator loop is stabilized by the limiter diodes 84, 86 and the limiter square wave at junction 82 is amplified and filtered of harmonics to deliver a stable output at junction 76. As the signal progresses through the circuit, it is attenuated at junction 88 where it becomes the first input signal to the integrated circuit amplifier 90 at input terminal 102. The output of amplifier 90 passes from junction 94 through capacitor 96 to the input terminal 12 of the filter network 10. The operation of the filter is as described with reference to FIG. 1, the filter blocking the frequency at which the circuit is oscillating; all other frequencies are permitted to pass through the filter to the output terminal 14. These "side" frequency signals continue on through resistors 98, 100 to the same input terminal 102 of amplifier 90. These side frequency signals (second input signal) are there subtracted from the first input signal of the same frequencies at terminal 102 and all undesirable frequencies (the side frequencies) are not allowed to pass through amplifier 90 due to this subtraction. The only frequency passing through amplifier 90 is the frequency of oscillation of the circuit which has been blocked by filter 10 and therefore is not subtracted at the input terminal 102. The amount of signal subtraction of the off center frequencies is controlled by the values of resistors 98, 100 thus enabling a high degree of stabilization to be obtained. The signal which passes through amplifier 90 is further amplified by amplifier 106. The output of the system is taken at terminal 112 which is the moving arm of potentiometer 114.

The system may also decode with the use of filter 10. The decode operation occurs when terminal 70 is grounded. This causes diode 72 to be back biased and resistor 74 is switched into the feedback path. As a result, the voltage which is fed back to junction 82 is attenuated and the reduced signal at that point is insufficient to sustain oscillation. However, the unit can decode the input signal which is placed at terminal 116. This signal becomes a square wave at junction 82 due to the operation of limiter diodes 118, 120. The signal is then added to the attenuated signal which is fed back to junction 82 (the amplitude is below the limiting level of diodes 84, 86) and then passes through the circuit and filter in a manner described with reference to the oscillator operation above.

The filter 10 may have various values assigned to its components depending upon its end use and the frequencies of the system in which it is functional. The following component values have been used for the network 10 to render it applicable to a system such as shown in FIG. 2. For this circuit, null network 10 was provided with the following component values, the numerals in the left column being those assigned to the components in FIG. 1:

| Resistors | Value (ohms) |
|---|---|
| 24 | $10^6$ |
| 26 | $10^6$ |
| 39 | $10^3$ |
| 48 | $1.1\times10^6$ |
| 41 | $3.3\times10^3$ |
| 39 | $10^3$ |
| **Capacitors** | **Value (microfarads)** |
| 22 | 0.0022 |
| 28 | 0.0022 |
| 46 | 0.0022 |
| 68 | 47 |
| **FETS** | **Type No.** |
| 38 | E421 |
| 40 | E421 |
| 62 | 2N5485 |

With the values above enumerated, variation of resistor 48 will result in a center frequency selection to include the range of 65 to 200 Hertz.

From the foregoing, it will be appreciated that the null filter of the invention satisfies a long standing need for a stable, easily adjustable, miniature, and economical device which is advantageous to the manufacturer and user alike. It will be further appreciated that the decoder-encoder circuit of the invention is a highly valuable device for commercial use in mobile radio and other applications. The use of integrated circuitry results in a subminiature package which is economic to manufacture, immune to shock and frequency stable during use. A change of one frequency to another is readily accomplished in the field by simply adjusting one control in the null network. The frequency change is made without affecting other tone squelch parameters thereby further improving its effectiveness.

What is claimed is:

1. A decoder-encoder circuit comprising, in combination, amplifier means having an input terminal and an output terminal, feedback means operatively connected between said output terminal and said input terminal of said amplifier effective to feedback the output signal of said amplifier to said input terminal, filter means operatively connected between said output terminal and said input terminal of said amplifier, said filter means comprising means for blocking a preselected frequency from passing through said filter and for passing all other frequencies therethrough, and isolation means effective to electrically isolate said filter during operation from the remainder of said decoder-encoder circuitry thereby to enable said filter to be electrically unaffected by said remainder of said circuitry, and means operatively connected to said input terminal of said amplifier effective to carry a voltage signal having frequencies equivalent to the frequencies passed through said filter and said frequency blocked by said filter, said input terminal of said amplifier being connected to cause subtraction of voltages of identical frequencies at said terminal.

2. In the decoder-encoder circuit of claim 1, variable control means operatively connected to said filter means and effective to vary the preselected frequency to be blocked by said blocking means.

3. The decoder-encoder circuit of claim 2, in which said variable control means comprises a single variable resistive element.

4. The decoder-encoder circuit of claim 3, in which said isolation means comprises a field effect transistor operatively connected between the output terminal of said filter means and the input terminal of said amplifier.

5. A frequency filtering network having an input and an output terminal comprising in combination, a. first phase shifting means adapted to phase shift an input signal voltage at said input terminal into first and second voltage signals displaced substantially ninety degrees from each other in phase;

b. first isolation means having input and output means, operatively connected at its input means to said first phase shifting means and adapted to isolate said first phase shifting means from other components of said filtering network so that the phase shifting function thereof is substantially unaffected by said other components;

c. second phase shifting means operatively connected to said output means of said first isolation means to receive one of said displaced voltage signals;
d. variable resistance means operatively connected to said output means of said isolation means and to said second phase shifting means, said variable resistance means adapted to receive the other of said displaced voltage signals; and,
e. second isolation means operatively connected to said second phase shifting means and said variable resistance means and to said output terminal of said network, said second isolation means being adapted to isolate said second phase shifting means and said variable resistance means from said output terminal so that the operation of said components is substantially unaffected during operation by other circuitry connected to said output terminal of said filter network.

6. The network of claim 5, in which said variable resistance means is adapted to cooperate with said second phase shifting means to provide a zero voltage at the output terminal of said network at a selected frequency of said input signal voltage, and to provide a zero voltage at said output terminal at other selected frequencies upon resetting of said variable resistance means to a different resistance value.

7. The network of claim 6, in which said variable resistance means is the sole continuously variable component affecting said frequency selection in said network.

8. The network of claim 5, in which said first phase shifting means comprises a first capacitance means connected to the input terminal of said network and first resistance means connected in series with said first capacitance means, and second resistance means connected to said input terminal of said network in parallel with said first capacitance means and a second capacitance means in series with said second resistance means.

9. The network of claim 8, in which said second phase shifting means comprises a third capacitance means.

10. The network of claim 9, in which said first, second and third capacitance means all have substantially the same capacitance value.

11. The network of claim 5, in which said first isolation means comprises first and second field effect transistors, and said second isolation means comprises a third field effect transistor.

12. The network of claim 8, in which said first isolation means comprises a first field effect transistor having an input terminal connected to the junction node between said first capacitance means and said first resistance means, and a second field effect transistor having an input terminal connected to the junction node between said second capacitance means and said second resistance means.

13. The network of claim 12, in which said second phase shifting means comprises a third capacitance means operatively connected to the output terminal of said first field effect transistor, and in which said variable resistance means is connected to the output terminal of said second field effect transistor.

14. The network of claim 13, in which said second isolation means comprises a third field effect transistor having an input terminal operatively connected to the node junction between said third capacitance means and said variable resistance means and having an output terminal operatively connected to the output terminal of said network.

15. The network of claim 14, in which said first, second and third capacitance means all have substantially the same capacitance value.

16. The network of claim 15, in which said variable resistance means is adapted to cooperate with said third capacitance means to provide a zero voltage at the node junction therebetween at a selected frequency of said input signal voltage, and to provide a zero voltage at said node junction at another selected frequency of an input signal voltage upon resetting of said variable resistance means to a different resistance value.

* * * * *